US009622081B1

United States Patent
Satish

(10) Patent No.: US 9,622,081 B1
(45) Date of Patent: Apr. 11, 2017

(54) SYSTEMS AND METHODS FOR EVALUATING REPUTATIONS OF WIRELESS NETWORKS

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/025,730

(22) Filed: Sep. 12, 2013

(51) Int. Cl.
H04L 29/06 (2006.01)
*H04W 12/10* (2009.01)
*H04W 12/12* (2009.01)

(52) U.S. Cl.
CPC ........... *H04W 12/10* (2013.01); *H04W 12/12* (2013.01)

(58) Field of Classification Search
CPC . H04L 63/1433; H04L 63/1416; H04L 63/20; H04L 63/1408; G06F 21/577; H04W 12/10; H04W 12/12
USPC ........................................................ 726/25
See application file for complete search history.

(56) References Cited

U.S. PATENT DOCUMENTS

| 8,646,074 B1* | 2/2014 | Gangadharan | H04W 12/12 726/22 |
| 8,655,312 B2* | 2/2014 | Stahlberg et al. | 455/410 |
| 8,776,225 B2* | 7/2014 | Pierson et al. | 726/23 |
| 8,949,993 B2* | 2/2015 | Basavapatna | H04W 4/02 726/25 |
| 2009/0328209 A1* | 12/2009 | Nachenberg | 726/22 |

OTHER PUBLICATIONS

Microsoft; How 802.11 Wireless Works; http://technet.microsoft.com/en-us/library/cc757419(v=ws.10).aspx; Mar. 28, 2003.
Ding, Qing et al., "Reputation based Access Point Selection in 802.11 Network", http://ieeexplore.ieee.org/xpl/login.jsp?tp=&arnumber=4682261&url=http%3A%2F%2Fieeexplore.ieee.org%2Fxpls%2Fabs_all.jsp%3Farnumber%3D4682261, as accessed Jun. 29, 2013, ICCIT '08, Third International Conference on Convergence and Hybrid Information Technology, 2008, (vol. 2), (Nov. 11-13, 2008), pp. 324-329.

* cited by examiner

*Primary Examiner* — Mahfuzur Rahman
*Assistant Examiner* — Narciso Victoria
(74) *Attorney, Agent, or Firm* — FisherBroyles LLP

(57) ABSTRACT

A computer-implemented method for evaluating reputations of wireless networks may include (1) identifying an endpoint computing system that is connected to a wireless network, (2) receiving, by a backend security server from the endpoint computing system, information that identifies the wireless network and that indicates in part a security state of the wireless network, (3) calculating, by the backend security server, a reputation of the wireless network based at least in part on the received information that identifies the wireless network and that indicates in part the security state of the wireless network, and (4) transmitting information about the calculated reputation of the wireless network to another endpoint computing system that is within range of the same wireless network. Various other methods, systems, and computer-readable media are also disclosed.

20 Claims, 6 Drawing Sheets ously access wireless networks. Unfortunately, users may not always have up-to-date information on the security status of

SYSTEMS AND METHODS FOR EVALUATING REPUTATIONS OF WIRELESS NETWORKS

BACKGROUND

Individuals and organizations often access wireless networks in order to gain access to larger, wide area networks (such as the Internet) or closed networks (such as an intranet, enterprise, or home network). Unfortunately, users may not always have up-to-date information on the security status of these wireless networks. For example, a wireless network radio may identify several available wireless networks, one or more of which may provide Internet connectivity. While some of these wireless networks may provide encryption that prevents unknown users from accessing the wireless network, others may be unsecured and/or compromised. For example, unsecured and/or compromised wireless access points may enable hackers and/or malware to modify network messages without permission and/or steal confidential information passing through the access point. Unfortunately, while a user's computer may display icons for available wireless networks, these icons may fail to provide any indication of whether a particular wireless network is safe and/or secure for connection, or is instead compromised and presents a security risk.

Accordingly, the instant disclosure identifies and addresses a need for additional and improved systems and methods for evaluating reputations of wireless networks.

SUMMARY

As will be described in greater detail below, the instant disclosure generally relates to systems and methods for evaluating reputations of wireless networks in part by providing information about the health of endpoint computing systems and the wireless networks to which they are associated or connected. The systems and methods may further calculate reputations for wireless networks based on the provided information about the health of the endpoint computing systems and the wireless networks. The systems and methods may also use the calculated reputations to provide appropriate or proportionate protection of endpoint computing systems based on the calculated reputations.

In one example, a computer-implemented method for evaluating reputations of wireless networks may include (1) identifying an endpoint computing system that is connected to a wireless network, (2) receiving, by a backend security server from the endpoint computing system, information that identifies the wireless network and that indicates in part a security state of the wireless network, (3) calculating, by the backend security server, a reputation of the wireless network based in part on the received information that identifies the wireless network and that indicates in part the security state of the wireless network, and (4) transmitting information about the calculated reputation of the wireless network to another endpoint computing system that is within range of the same wireless network.

In one embodiment, the information that identifies the wireless network may include information that identifies the wireless access point. In some examples, the information that identifies the wireless access point may include a media access control address.

In one example, the information that identifies the wireless access point may include a service set identifier. In addition, receiving, by the backend security server from the endpoint computing system, information that identifies the wireless network may include (1) extracting, by the endpoint computing system, the information that identifies the wireless network from a beacon frame generated by the wireless access point, and (2) transmitting, by the endpoint computing system, the information that identifies the wireless network to the backend security server.

In one embodiment, receiving, by the backend security server from the endpoint computing system, information that identifies the wireless network may include (1) extracting the information that identifies the wireless network from a data frame generated by the endpoint computing system and directed to the wireless access point, and (2) transmitting the information that identifies the wireless network to the backend security server. In addition, receiving, by the backend security server from the endpoint computing system, information that identifies the wireless network may include (1) modifying a received network message by copying the information that identifies the wireless network from a data link layer of the network message to a different layer of the same network message, and (2) forwarding the modified network message.

In one example, the information that indicates in part the security state of the wireless network may include an encryption status of the wireless network. In addition, the information that indicates in part the security state of the wireless network may include information that indicates a threat detection at the endpoint computing system. In some embodiments, the information that indicates in part the security state of the wireless network may include information that indicates a hygiene of the endpoint computing system.

In some examples, transmitting information about the calculated reputation of the wireless network to the other endpoint computing system may include displaying an indication of the reputation to a user of the other endpoint computing system. In addition, the computer-implemented method may further include taking remedial action to protect the other endpoint computing system in response to determining that the reputation of the wireless network indicates a security threat.

In one embodiment, a system for implementing the above-described method may include (1) an identification module that identifies an endpoint computing system that is connected to a wireless network, (2) a reception module that receives, by a backend security server from the endpoint computing system, information that identifies the wireless network and that indicates in part a security state of the wireless network, (3) a calculation module that calculates, by the backend security server, a reputation of the wireless network based in part on the received information that identifies the wireless network and that indicates in part the security state of the wireless network, (4) a transmission module that transmits information about the calculated reputation of the wireless network to another endpoint computing system that is within range of the same wireless network, and (4) at least one processor configured to execute the identification module, the reception module, the calculation module, and the transmission module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an endpoint computing system that is connected to a wireless network, (2) receive, by a backend security server from the endpoint computing system, information that identifies the wireless network and that indicates in part a security state of the wireless network, (3) calculate, by the backend security server, a reputation of the wireless network based in part on the received information that identifies the wireless network and that indicates in part the security state of the wireless network, and (4) transmit information about the calculated reputation of the wireless network to another endpoint computing system that is within range of the same wireless network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
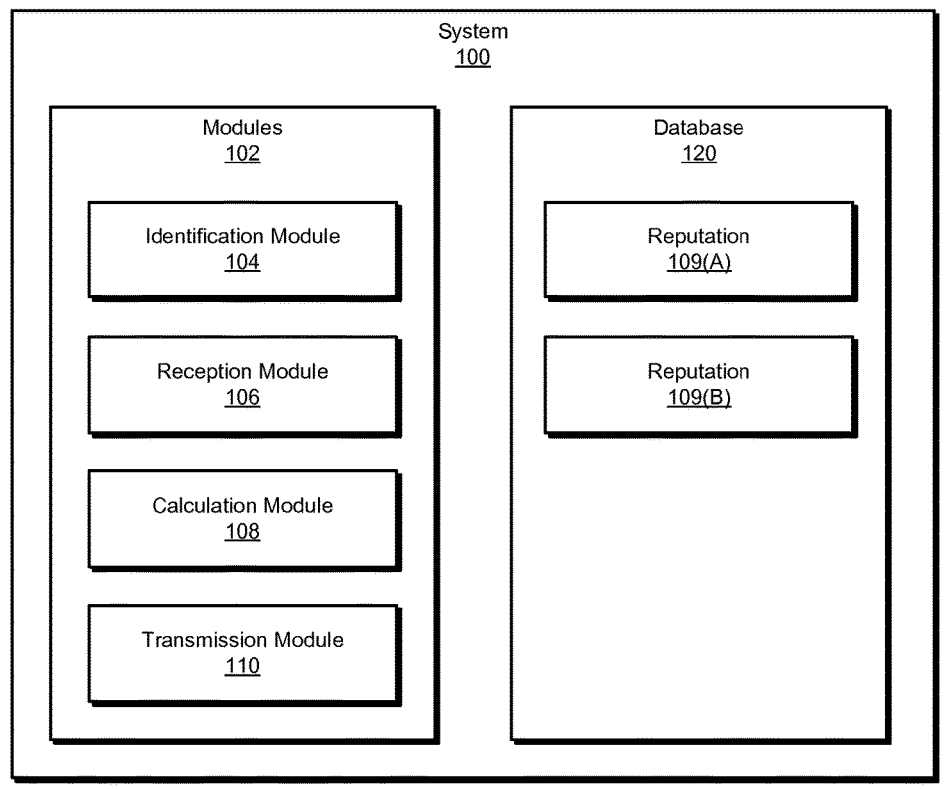
FIG. 1 is a block diagram of an exemplary system for evaluating reputations of wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for evaluating reputations of wireless networks. As will be explained in greater detail below, the systems and methods herein may provide reputations for wireless networks that enable computing systems and/or users to make more informed decisions about whether to connect to a wireless network. The systems and methods herein may also provide reputations for wireless networks that enable more accurate and finely calibrated protection of users and computing systems from wireless networks that have been compromised or infected with malware.

Figure 2:
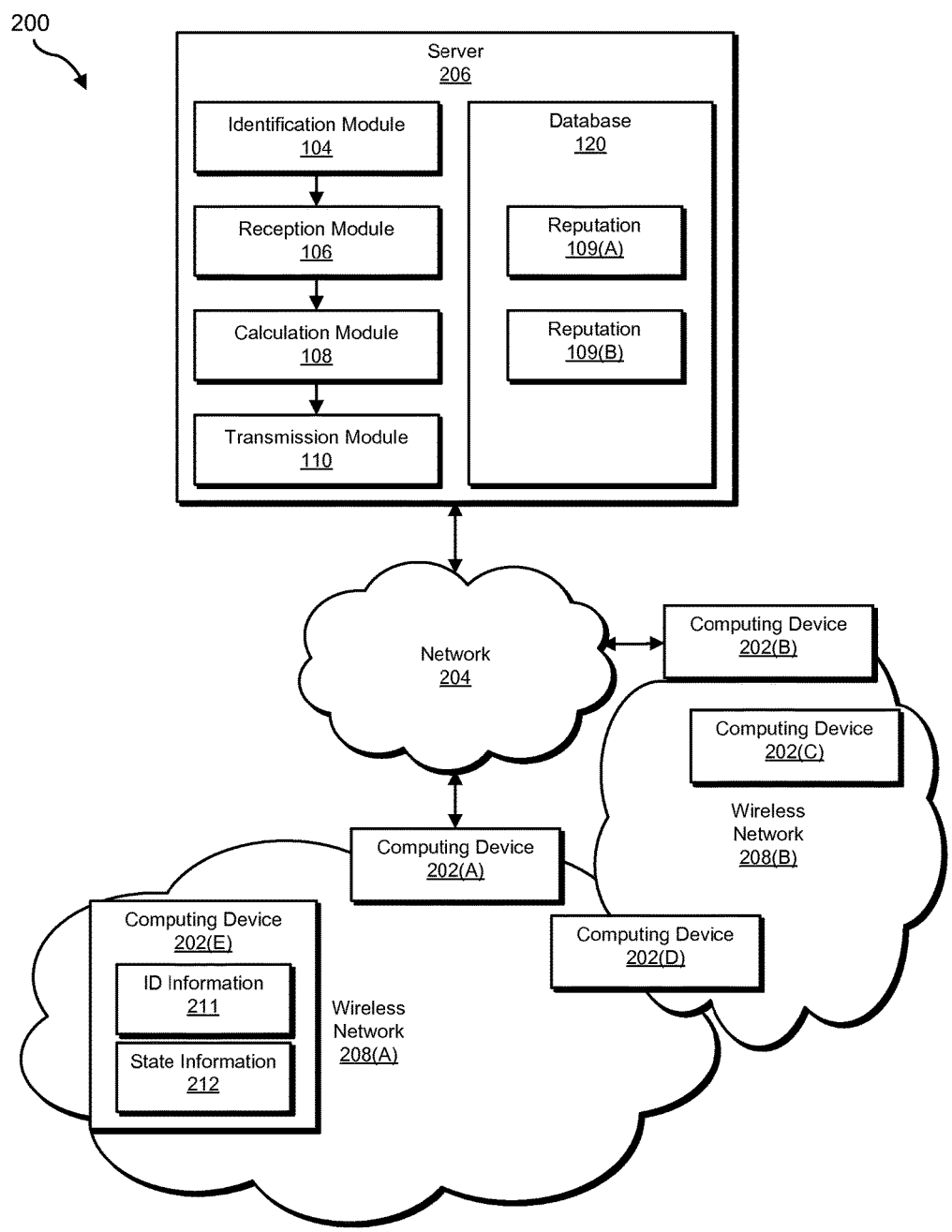
FIG. 2 is a block diagram of an exemplary system for evaluating reputations of wireless networks.

The following will provide, with reference to FIGS. 1-2, detailed descriptions of exemplary systems for evaluating reputations of wireless networks. Detailed descriptions of corresponding computer-implemented methods will also be provided in connection with FIG. 3. Moreover, detailed descriptions of an exemplary graphical user interface will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for evaluating reputations of wireless networks. As illustrated in this figure, exemplary system 100 may include one or more modules 102 for performing one or more tasks. For example, and as will be explained in greater detail below, exemplary system 100 may include an identification module 104 that may identify an endpoint computing system that may be connected to a wireless network. Exemplary system 100 may additionally include a reception module 106 that may receive, by a backend security server from the endpoint computing system, information that identifies the wireless network and that indicates in part a security state of the wireless network. Exemplary system 100 may also include a calculation module 108 that may calculate, by the backend security server, a reputation of the wireless network based in part on the received information that identifies the wireless network and that indicates in part the security state of the wireless network. Exemplary system 100 may additionally include a transmission module 110 that may transmit information about the calculated reputation of the wireless network to another endpoint computing system that may be within range of the same wireless network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(A)-(E) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputations for wireless networks. FIG. 1 shows that database 120 includes a reputation 109(A) and a reputation 109(B) for respective wireless networks. Database 120 may also store information used to calculate these reputations, including information that (e.g., uniquely) identifies a wireless network, and information that in part indicates a security state of the wireless network.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more computing devices 202, such as computing devices 202(A), 202(B), 202(C), 202(D), and 202(E), in communication with a server 206 via a network 204. Computing devices 202(A)-(E) may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, computing devices 202(A) and 202(B) may represent and/or include wireless access points, wireless gateways, and/or wireless routers. Computing device 202(E) may be within range of computing device 202(A) and connect to wireless network 208(A) through computing device 202(A) as a wireless access point. Similarly, computing device 202(C) may be within range of computing device 202(B) and connect to wireless network 208(B) through computing device 202(A) as a wireless access point. As shown in FIG. 2, database 120 may include reputation 109(A) and reputation 109(B) for wireless networks 208(A) and 208(B), respectively. Wireless networks 208(A) and 208(B) may both provide further connectivity to network 204, which may include a wide area network such as the Internet. By contrast, computing device 202(D) may be within range of both computing device 202(E) and computing device 202(C), and may connect to either as a wireless access point. Alternatively, or additionally, two or more of computing devices 202(A), 202(B), 202(C), 202(D), and 202(E) may connect to each other directly in an ad hoc mode without using a wireless access point as an intermediary.

As further shown in FIG. 2, computing device 202(E) may contain ID information 211 and state information 212. Although not shown in FIG. 2, the remaining computing devices 202(B), 202(C), 202(D), and 202(E) may similarly contain ID information and state information. ID information 211 may provide information that uniquely or non-uniquely identifies (e.g., aids in identifying) a wireless network, such as wireless network 208(A). Similarly, state information 212 may indicate, in whole or in part, a security state of the wireless network. In some examples, computing devices 202(A), 202(B), 202(C), 202(D), and 202(E) may provide ID information 211 and/or state information 212 to server 206. In some embodiments, computing devices 202 (A)-(E) may correspond to endpoint computing systems, and server 206 may correspond to a backend security server.

In one embodiment, one or more of modules 102 from FIG. 1 may, when executed by at least one processor of computing devices 202(A)-(E) and/or server 206, facilitate computing devices 202(A)-(E) and/or server 206 in evaluating reputations of wireless networks. For example, identification module 104 may be programmed to identify an endpoint computing system, such as computing device 202 (E), that is connected to a wireless network, such as wireless network 208(A). Reception module 106 may be programmed to receive, by a backend security server, such as server 206, information from the endpoint computing system that identifies a wireless network 208(A) (i.e., ID information 211) and that indicates in part a security state of the wireless network (i.e., state information 212). Calculation module 108 may be programmed to calculate, by the backend security server, a reputation 109(A) of the wireless network 208(A) based in part on the received information that identifies wireless network 208(A) and that indicates in part the security state of the wireless network. Transmission module 110 may be programmed to transmit information about the calculated reputation of the wireless network 208(A) to another endpoint computing system, such as computing device 202(D), that is within range of the same wireless network 208(A).

Computing devices 202(A)-(E) generally represent any type or form of computing device capable of reading computer-executable instructions. Examples of computing devices 202(A)-(E) include, without limitation, laptops, tablets, desktops, servers, cellular phones, Personal Digital Assistants (PDAs), multimedia players, embedded systems, wireless access points, wireless routers, wireless gateways, wired routers, gateways, and/or modems, combinations of one or more of the same, exemplary computing system 510 in FIG. 5, or any other suitable computing device.

Server 206 generally represents any type or form of computing device that is capable of managing and calculating reputations for wireless networks. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing devices 202(A)-(E) and server 206.

Figure 3:
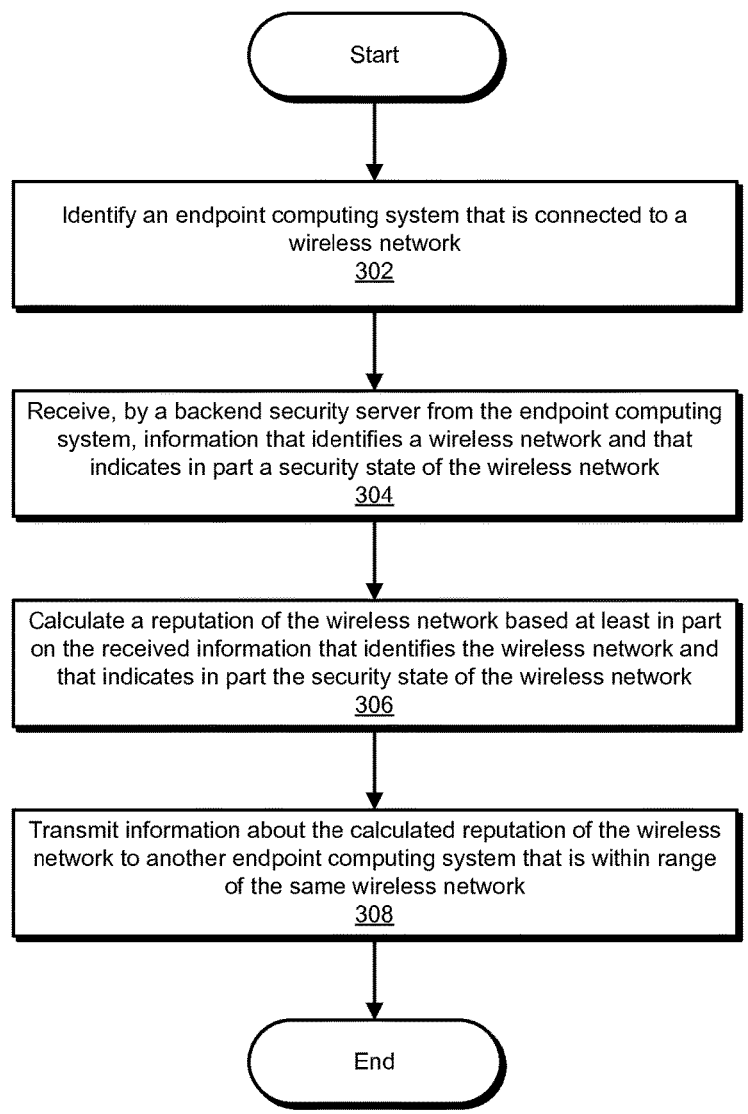
FIG. 3 is a flow diagram of an exemplary method for evaluating reputations of wireless networks.

FIG. 3 is a flow diagram of an exemplary computer-implemented method 300 for evaluating reputations of wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an endpoint computing system that is connected to a wireless network. For example, at step 302 identification module 104 may, as part of server 206 in FIG. 2, identify an endpoint computing system that is connected to wireless network 208(A).

Identification module 104 may identify the endpoint computing device in a variety of ways. For example, identification module 104 may receive a network message or package through network 204 from the endpoint computing device. This message may identify the endpoint computing device in part by identifying a user, account, and/or license associated with the endpoint computing device. For example, computing device 202(E) in FIG. 2 may direct a message to a security application running on server 206. This message may include a request for reputation data, or a security analysis, of one or more entities (e.g., portable executables, websites, contacts, emails, etc.). The message may also include a status update on the health, security state, and overall functioning of the endpoint computing system. Moreover, the message may further include information that uniquely or non-uniquely identifies the endpoint computing machine. In the example of FIG. 2, computing device 202(E) may include a hardware-encoded identifier, software-generated identifier, globally unique identifier, vendor serial number, software license registration number, and/or a hash of one or more of those, in a message to server 206.

Identification module 104 may also identify the endpoint computing system without receiving a message from the endpoint computing system. Identification module 104 may identify the endpoint computing system by polling another endpoint computing system, such as computing device 202(A) as a wireless access point or gateway, or a network directory, for information about connected, associated, previously-connected, and/or identified endpoint computing systems.

At step 304, one or more of the systems described herein may receive, by a backend security server, information from the endpoint computing system that identifies a wireless network and that indicates in part a security state of the wireless network. For example, at step 304 reception module 106 may, as part of server 206 in FIG. 2, receive from computing device 202(E) information that identifies wireless network 208(A) and that indicates in part a security state of wireless network 208(A).

Reception module 106 may perform step 304 in a variety of ways. In one example, reception module 106 may receive a message from a security or other application at the endpoint computing system. This message may include the same message as discussed above for step 302, or a different message. In the example of FIG. 2, a security application at computing device 202(E) may transmit a request for a reputation or security analysis of an entity to server 206. Additionally, or alternatively, computing device 202(E) may transmit a periodic or scheduled status update to server 206, without requesting further information. The security application at computing device 202(E) may include the information that identifies the wireless network and that indicates in part a security state of the wireless network in the message to server 206. For example, computing device 202(E) may include ID information 211 and state information 212 within the message to server 206.

In one embodiment, the information received by reception module 106 that identifies the wireless network may include information that identifies the wireless access point. For example, computing device 202(E) may include an identifier of computing device 202(A), as a wireless access point to wireless network 208(A), in a message to reception module 106 in server 206.

The information received by reception module 106 that identifies the wireless access point may also include a media access control address and/or a service set identifier. For example, the information that identifies the wireless access point may include an address from one of four fields in a wireless (e.g., 802.11 protocol) media access control frame, including a destination address, a source address, a receiver address, and/or a transmitter address. If the wireless network includes multiple basic service sets and/or multiple wireless access points (e.g., in an extended service set), any one or more of the basic service set identifiers and/or wireless access point identifiers may uniquely and/or non-uniquely identify the wireless network. In other words, the systems and methods described herein my establish reputations for each wireless network associated with an access point within a larger, extended service set network, and/or may establish a reputations for the larger wireless network itself (e.g., for the distribution system for the wireless network). Moreover, the information that (uniquely or non-uniquely) identifies the wireless access point may include a wireless access point manufacturer, model, and/or serial number or identifier, a wireless network name (e.g., user configured name), a wireless encryption (e.g., WEP, WAP, AES) password or key, and/or an identifier (e.g., name, phone, address, social security number, etc.) of an administrator, owner, and/or user of the wireless network.

In some examples, the information received by reception module 106 that identifies the wireless access point may also include any other globally unique identifier, hardware encoded identifier, software generated identifier, and/or any other suitable identifier. This information may also include any identifier, composite, permutation, and/or derivation formed by hashing, encrypting, decorating, mangling, and/or otherwise modifying one or more of the above fields or items of information.

In one embodiment, a security application at computing device 202(E) may generate a message to reception module 106 and include the wireless network identifier within the message. The security application may generate such a message that identifies the wireless access point at a fixed interval, according to a predetermined schedule, in response to detecting a malware signature hit or intrusion (or a threshold number of signature hits), and/or in response to a query (e.g., from server 206). The security application may also generate the message in all, some, or substantially all requests, directed to server 206, for one or more reputations or security analyses.

In some embodiments, a driver, such as a filter driver, may intercept or inspect previously-generated outgoing messages directed to a wireless access point. The driver may insert the wireless network identifier, such as ID information 211, into the outgoing message prior to transmission to wireless network 208(A). For example, the driver may insert the wireless network identifier into an application layer of the message. The driver may also insert the wireless network identifier into a special, unused, or reserved field or series of bits within the wireless message. In general, reception module 106 may receive, by the backend security server from the endpoint computing system, information that identifies the wireless network by directing or facilitating (1) extracting, by the endpoint computing system, the information that identifies the wireless network from a beacon frame generated by the wireless access point, and (2) transmitting, by the endpoint computing system, the information that identifies the wireless network to the backend security server.

Additionally, or alternatively, reception module 106 may receive, by the backend security server from the endpoint computing system, information that identifies the wireless network in part by directing or facilitating (1) modifying a received network message by copying the information that identifies the wireless network from a data link layer of the network message to a different layer of the same network message and (2) forwarding the modified network message. If the endpoint computing system includes a wireless access point or gateway, the wireless access point or gateway may insert an identifier of the wireless access point or gateway, or corresponding wireless network, in a completed, received message (e.g., without copying the identifier from another layer of the message) and then forward the message to a destination server, such as server 206. In general, inserting the wireless network identifier into the message (e.g., into an application or other layer of the message) may preserve an ability of the message to identify the wireless network after the same, similar, or different identifying information is stripped from a data link layer (e.g., under the OPEN SYSTEMS INTERCONNECTION reference model) or link layer (e.g., under the TCP/IP reference model) of the message prior to reception by reception module 106 at server 206.

Moreover, the driver may inspect a destination of the network message, and may condition the insertion of the wireless network identifier into the message based on a determination that the destination would expect, recognize, benefit from, and/or use the wireless identifier (e.g., that the destination is a backend security server such as server 206 or that the destination matches an entry on a list of security servers). The driver may also condition the insertion of the wireless network identifier into the message based on a determination that the message includes a predetermined flag or marker that indicates or requests marking the message (e.g., at the application layer) with an identifier of the wireless network.

The driver may obtain the wireless network identifier in a variety of ways, including from the operating system of computing device 202(E), from a wireless network card interface, and/or from the data link layer of a completed or previously-generated wireless network message. For example, reception module 106 may receive, by the backend security server from the endpoint computing system, information that identifies the wireless network in part by directing or facilitating (1) extracting the information that identifies the wireless network from a data frame generated by the endpoint computing system and directed to the wireless access point and (2) transmitting the information that identifies the wireless network to the backend security server. More specifically, the driver may copy the wireless network identifier from the data link layer of a wireless network message and paste the wireless network identifier into another layer, such as the application layer, in a special, unused, prepared, and/or reserved field or series of bits. Upon inserting the wireless network identifier, the systems and methods described herein may add one or more delimiters to distinguish the wireless network identifier from a remainder of the network message and/or mark the location of the wireless network identifier within the message.

Reception module 106 may receive the information that indicates in whole or in part a security state of the wireless network in a variety of forms. In one embodiment, the information received by reception module 106 that indicates in part the security state of the wireless network may include an encryption status of the wireless network, including a type of encryption, a strength of encryption, and an active/inactive status of encryption. Additionally, the information received by reception module 106 that indicates in part the security state of the wireless network may include information that indicates a threat detection at the endpoint computing system. Moreover, the information received by reception module 106 that indicates in part the security state of the wireless network may include information that indicates a hygiene of the endpoint computing system. In other examples, the information received by reception module 106 may also indicate a threat detection or hygiene of other endpoint computing systems connected to, associated with, in range of, and/or previously connected to the same wireless network (i.e., in a case that the endpoint computing system, such as a wireless gateway, has information about threat detections or hygiene of other endpoint computing systems on the same wireless network).

At step 306, one or more of the systems described herein may calculate, by the backend security server, a reputation of the wireless network based in part on the received information that identifies the wireless network and that indicates in part the security state of the wireless network. For example, at step 306 calculation module 108 may, as part of server 206 in FIG. 2, calculate a reputation of the wireless network 208(A) based in part on the received information that identifies the wireless network 208(A) and that indicates in part the security state of the wireless network 208(A).

Calculation module 108 may calculate the reputation in a variety of ways. In general, calculation module 108 may calculate the reputation for the wireless network based on information received from the endpoint computing system, such as computing device 202(E), and another endpoint computing system, such as computing device 202(D). In some examples, calculation module 108 may average and/or aggregate information received from multiple endpoint computing systems to derive the reputation for the wireless network. These endpoint computing systems may include all, some, or substantially all endpoint computing systems known by calculation module 108 to be connected and/or associated with the wireless network. Calculation module 108 may also compare an average, composite, and/or aggregated score or scores for the wireless network with other scores for other wireless networks to determine a relative reputation for the wireless access point. In general, calculation module 108 may base the reputation for the wireless access point on an absolute or relative number, frequency, proportion, and/or intensity of malware signature detections at machines, intrusion detections at machines, and/or low hygiene machines (relatively low hygiene or having a hygiene score below a threshold) currently connected, previously connected, and/or associated with the wireless network. Calculation module 108 may also base the reputation for the wireless network on an encryption status and/or strength of the wireless network, and/or a degree of familiarity between the endpoint computing system (and/or its user) and the wireless network (e.g., a number and/or duration of connections to the wireless network by the endpoint computing system).

Lastly, calculation module 108 may base the reputation for the wireless network on a user indication of whether wireless network is trusted/untrusted (or a degree of trust). Notably, calculation module 108 may exclude, or weigh less, these user indications of trust when calculating a reputation for the benefit of other users or endpoint computing systems (i.e., thereby preventing or diminishing the ability of a malicious user to compromise or attack other users). For example, calculation module 108 may weigh the input of another user based on a degree of trust or friendship (e.g., in a social network graph) between the other user and the user at the endpoint computing system that receives the reputation information. In general, calculation module 108 may specify the reputation for the wireless network by uniquely associating the reputation (e.g., as a reputation score or value along a range, such as a range from safe to malicious and/or unknown) with an identifier for the wireless network as a whole, such as service set identifier or media access control address.

At step 308, one or more of the systems described herein may transmit information about the calculated reputation of the wireless network to another endpoint computing system that is within range of the same wireless network. For example, at step 308 transmission module 110 may, as part of server 206 in FIG. 2, transmit information about the calculated reputation of the wireless network 208(A) to another endpoint computing system, such as computing device 202(D), that is within range of the same wireless network 208(A).

Transmission module 110 may transmit the information about the calculated reputation in a variety of forms. In some examples, the information may merely identify, in part or in whole, the calculated reputation for the wireless network. For example, transmission module 110 may transmit information about the calculated reputation of the wireless network to the other endpoint computing system, which may display an indication of the reputation to a user of the other endpoint computing system. Transmission module 110 may also transmit the calculated reputation or reputations in response to a request for the other endpoint computing system, which may request the reputation(s) in response to identifying, coming into range of, and/or connecting to one or more wireless networks.

Figure 4:
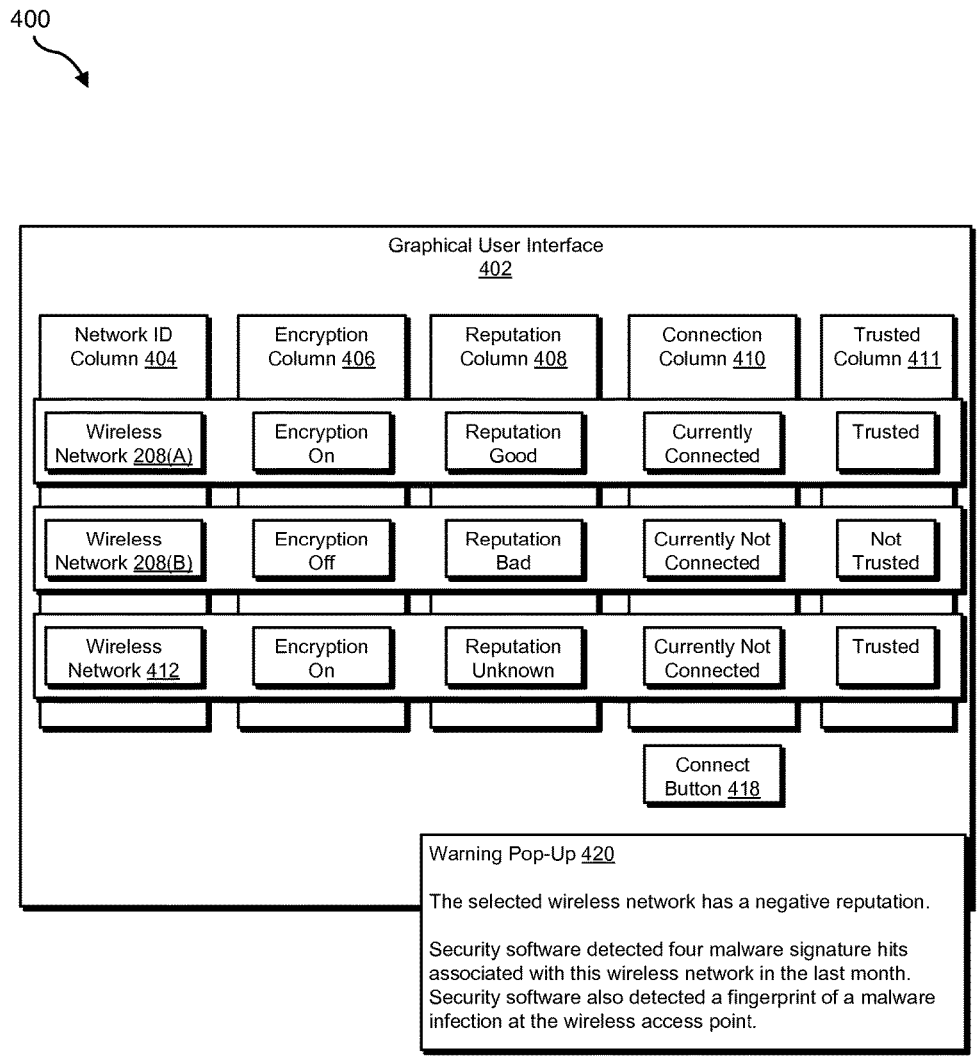
FIG. 4 is a block diagram of an exemplary graphical user interface for evaluating reputations of wireless networks.

FIG. 4 shows an exemplary graphical user interface (GUI) system 400 that may be used with the systems and methods for evaluating reputations of wireless networks. As shown in FIG. 4, a GUI 402 may identify three wireless networks (e.g., indicate that they are within range of a radio in computing device 202(D)): wireless network 208(A), wireless network 208(B), and a wireless network 412 (not shown in FIG. 2). GUI 402 may include a network ID column 404, which may indicate a name of each wireless network. GUI 402 may further include an encryption column 406, which may indicate an encryption status for each wireless network. Moreover, GUI 402 may include a reputation column 408, which may indicate a reputation (e.g., good/safe, bad/malicious, unknown) for the wireless network. GUI 402 also may include a connection column 410, which may indicate a connection status between computing device 202(D) and each wireless network. Lastly, GUI 402 may include a trusted column 411, which may indicate whether a user at the other endpoint computing system has indicated that the wireless network is trusted. In some examples, a user may toggle whether the wireless network is trusted or untrusted by clicking within trusted column 411, for example, or entering any other suitable input.

As shown in FIG. 4, GUI 402, and/or an underlying security application, may automatically, or upon a user prompt, request and/or display reputations for one or more wireless networks (e.g., wireless networks to which the other endpoint computing system is connected, within range of, in which the user has indicated an interest, and/or which the systems and methods predict the user may encounter). As further shown in FIG. 4, GUI 402 may automatically, or upon a user prompt, display more detailed information about the reputation of a wireless network. In one example, this detailed information may include a warning pop-up 420, which may specify details about malware signature detections and intrusion detections at machines connected to the wireless network, and/or the health, hygiene, and/or reputations of other machines connected to the wireless network. For example, GUI 402 may display that a friend, as designated in a security network or social network product, has already indicated that a particular wireless network is trusted. GUI 402 may also display any of the other information that calculation module 108 uses to calculate the reputation for the wireless network, as discussed above for step 308. In one example, a user at the other endpoint computing system may base a decision about whether to connect to a wireless network on the displayed or reported reputation information. The user may also elect to connect to a particular wireless network by selecting the wireless network and then pressing connect button 418.

In some examples, the systems and methods described herein may include taking remedial action to protect the other endpoint computing system in response to determining that the reputation of the wireless network indicates a security threat. For example, the information about the reputation that transmission module 110 transmits to the other endpoint computing system may include a command to protect or further protect the endpoint computing system from a wireless network having a negative reputation (e.g., a negative reputation below a threshold). In one embodiment, this command from transmission module 110 may prompt a user to enable the protection, or may bypass a user to automatically enable the protection. In this embodiment, the protection may elevate security settings (i.e., stricter security settings) of a security application or product. The protection may also limit or diminish connectivity with the wireless network, including a type or frequency of transactions available on the wireless network. For example, the protection may block or diminish downloads of portable executable files or require or suggest the use of a more trusted domain name system server. The protection may also block access to the wireless network altogether, or potentially permit an administrative override. The information transmitted by transmission module 110 may also include a command to one endpoint computing system (e.g., a wireless access point or gateway) to enable protections that protect another endpoint computing system from a wireless network (e.g., a client laptop).

The following provides a higher-level perspective overview of the systems and methods described herein. In wireless networks, there are security risks in connecting to untrusted networks. There have been reports of rogue wireless networks and infections/attacks via unsecured networks, etc. An access point profile may include a unique identifier (such as a hash or a globally unique identifier) to uniquely identify an access point for information, such as device manufacturer name, a network name, a service set identifier, and a media access control address. Capability information such as a security status, encryption type, and authentication information may be easily available in the beacon frame that the access point transmits regularly. Any change in any setting on the access point may imply a new access point profile.

A client side agent may start collecting and submitting information for access point profiles or reputations. Optionally, the client side agent may maintain a local cache of all seen and connected-to access points, or even just seen but never connected to profiles, so that clients can avoid resending redundant information to a backend server.

The backend server may start generating reputation information for every access point on the basis of one or more of the following: (A) infections detected on an end point computing system or malicious websites visited while connected to that access point, (B) the number of poor hygiene machines connected to that access point, (C) a profile status such as secured or not and encryption status, etc., and/or (D) user trusted home/work access point versus untrusted (public, friend, etc.).

The security agent on the client may begin including an identifier of the access point with every security/reputation query. The security provider may begin responding with access point reputation information in every response.

If the access point is new/unknown to the client machine, then the client machine may warn the user. If this is a public access point, then the systems and methods may suggest a strict security profile. If this a home access point, then the user may mark the access point as trusted.

Users can continue to add trusted access points as they connect to them. Alternatively or additionally, administrators can set the trusted access points in product settings proactively. Managed endpoints can receive information on trusted access points via any product supported settings distribution mechanism.

Products can use access point reputations to now warn the user, to suggest stricter security settings, and/or to automatically switch the user to stricter security settings. Different types of products can use different thresholds and settings. Security settings can include blocking all portable executable downloads and/or using a trusted domain name system server.

As explained above in connection with method 300 in FIG. 3, the systems and methods herein may provide reputations for wireless networks that enable computing systems and/or users to make more informed decisions about whether to connect to a wireless network. The systems and methods herein may also provide reputations for wireless networks that enable more accurate and finely calibrated protection of users and computing systems from wireless networks that have been compromised or infected with malware.

Figure 5:
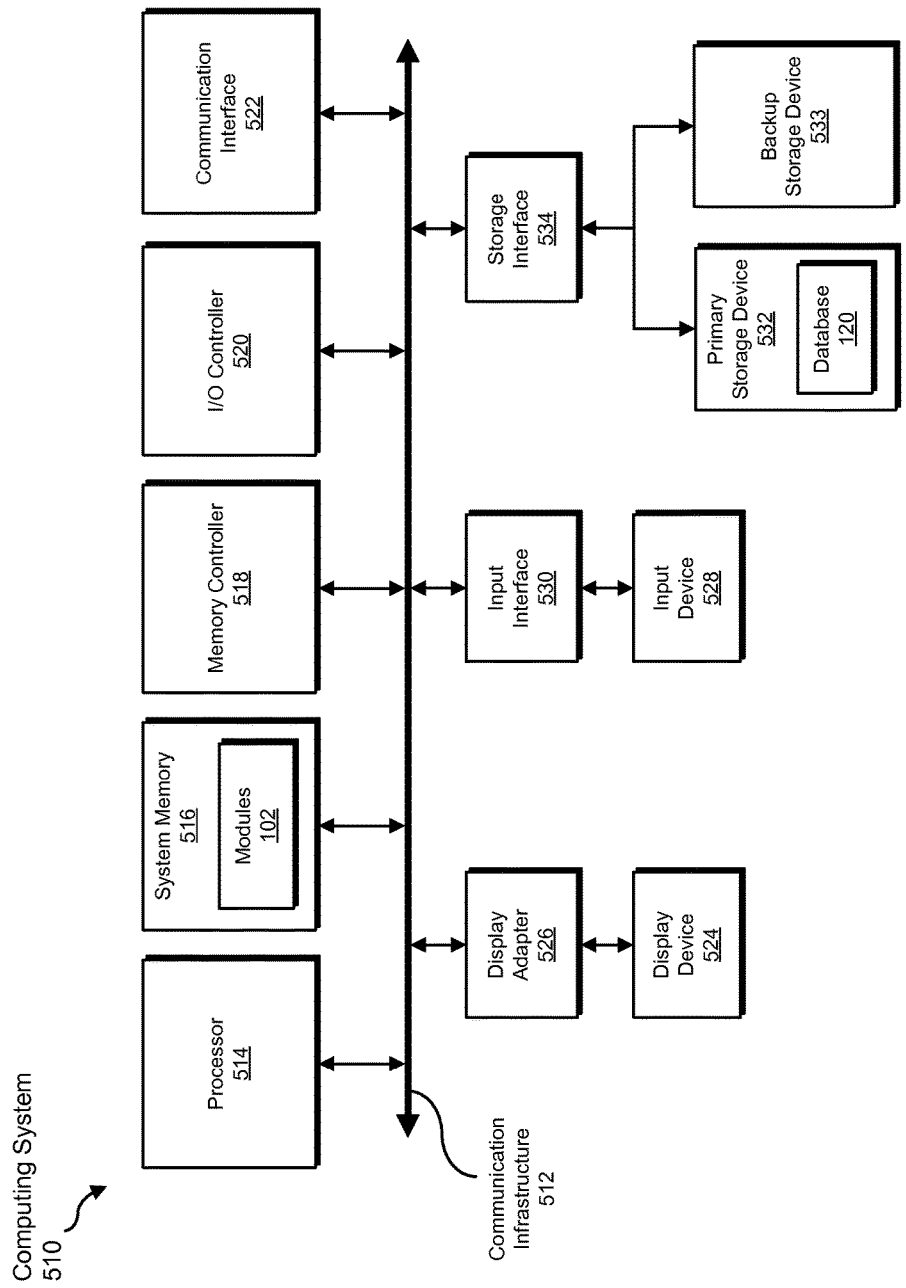
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
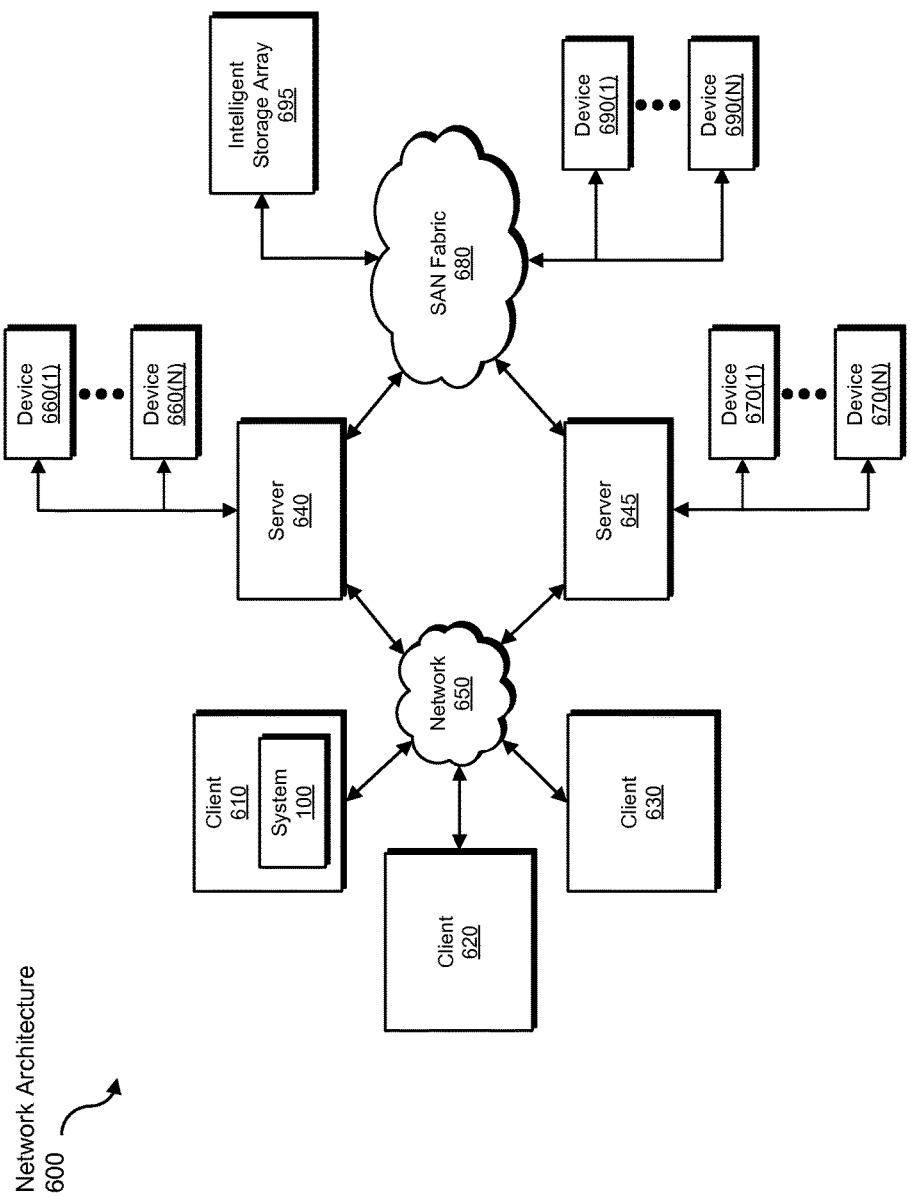
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for evaluating reputations of wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information identifying a wireless network, information indicating a security state of a wireless network, and/or a request for reputation information, transform the data into a reputation for the wireless network, output a result of the transformation to an endpoint computing system, use the result of the transformation to protect the endpoint computing system from infected or malicious wireless networks, and/or store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for evaluating reputations of wireless networks, at least a portion of the method being performed by a computing device comprising at least one processor, the method comprising:
    identifying an endpoint computing system that is connected to a wireless network;
    receiving, by a backend security server from the endpoint computing system:
        information that identifies the wireless network;
        information that indicates in part a security state of the wireless network by indicating at least:
            a degree of trust of the wireless network provided by a user of the endpoint computing system; and
            a hygiene score of the endpoint computing system;
    calculating, by the backend security server, a reputation of the wireless network based at least in part on:
        the received information that identifies the wireless network and that indicates in part the security state of the wireless network; and
        a number of endpoint computing systems that are associated with the wireless network that have hygiene scores below a threshold score; and
    improving a security state of another endpoint computing system that is within range of the same wireless network by transmitting information about the calculated reputation of the wireless network to the another endpoint computing system to prevent the another endpoint computing system from connecting to the wireless network in response to determining that the wireless network represents a security risk based on the calculated reputation.

2. The computer-implemented method of claim 1, wherein
    the information that identifies the wireless network comprises information that identifies a wireless access point.

3. The computer-implemented method of claim 2, wherein the information that identifies the wireless access point comprises a media access control address.

4. The computer-implemented method of claim 2, wherein the information that identifies the wireless access point comprises a service set identifier.

5. The computer-implemented method of claim 2, wherein receiving, by the backend security server from the endpoint computing system, information that identifies the wireless network comprises:
    extracting, by the endpoint computing system, the information that identifies the wireless network from a beacon frame generated by the wireless access point; and
    transmitting, by the endpoint computing system, the information that identifies the wireless network to the backend security server.

6. The computer-implemented method of claim 2, wherein receiving, by the backend security server from the endpoint computing system, information that identifies the wireless network comprises:

extracting the information that identifies the wireless network from a data frame generated by the endpoint computing system and directed to the wireless access point; and transmitting the information that identifies the wireless network to the backend security server.

7. The computer-implemented method of claim 6, wherein receiving, by the backend security server from the endpoint computing system, information that identifies the wireless network comprises:

modifying a received network message by copying the information that identifies the wireless network from a data link layer of the network message to a different layer of the same network message; and forwarding the modified network message.

8. The computer-implemented method of claim 1, wherein the information that indicates in part the security state of the wireless network further comprises an encryption status of the wireless network.

9. The computer-implemented method of claim 1, wherein calculating the reputation of the wireless network comprises assigning weights to both the degree of trust of the wireless network provided by the user of the endpoint computing system and the number of endpoint computing systems that are associated with the wireless network that have hygiene scores below the threshold score, wherein the weight assigned to the degree of trust of the wireless network is less than the weight assigned to the number of endpoint computing systems to prevent the user of the endpoint computing system from compromising a user of the another endpoint computing system.

10. The computer-implemented method of claim 9, wherein the weight of the degree of trust of the wireless network is based at least in part on a relationship between the user of the endpoint computing system and the user of the another endpoint computing system.

11. The computer-implemented method of claim 1, wherein transmitting information about the calculated reputation of the wireless network to the another endpoint computing system comprises displaying an indication of the reputation to a user of the another endpoint computing system.

12. The computer-implemented method of claim 1, further comprising taking remedial action to protect the another endpoint computing system in response to determining that the reputation of the wireless network indicates a security threat.

13. A system for evaluating reputations of wireless networks, the system comprising:

an identification module that identifies an endpoint computing system that is connected to a wireless network;

a reception module that receives, by a backend security server from the endpoint computing system:

information that identifies the wireless network;

information that indicates in part a security state of the wireless network by indicating at least:

a degree of trust of the wireless network provided by a user of the endpoint computing system; and a hygiene score of the endpoint computing system;

a calculation module that calculates, by the backend security server, a reputation of the wireless network based at least in part on:

the received information that identifies the wireless network and that indicates in part the security state of the wireless network; and a number of endpoint computing systems that are associated with the wireless network that have hygiene scores below a threshold score;

a transmission module that improves a security state of another endpoint computing system that is within range of the same wireless network by transmitting information about the calculated reputation of the wireless network to the another endpoint computing system to prevent the another endpoint computing system from connecting to the wireless network in response to determining that the wireless network represents a security risk based on the calculated reputation; and at least one physical processor configured to execute the identification module, the reception module, the calculation module, and the transmission module.

14. The system of claim 13, wherein the information that identifies the wireless network comprises information that identifies a wireless access point.

15. The system of claim 14, wherein the information that identifies the wireless access point comprises a media access control address.

16. The system of claim 14, wherein the information that identifies the wireless access point comprises a service set identifier.

17. The system of claim 14, wherein the system is configured such that, prior to being received, the information that identifies the wireless network is:

extracted, by the endpoint computing system, from a beacon frame generated by the wireless access point; and transmitted, by the endpoint computing system, to the backend security server.

18. The system of claim 14, wherein the system is configured such that, prior to being received, the information that identifies the wireless network is:

extracted from a data frame generated by the endpoint computing system and directed to the wireless access point; and transmitted to the backend security server.

19. The system of claim 18, wherein the system is configured such that, prior to being received, the information that identifies the wireless network is copied, during modification of a network message, from a data link layer of the network message to a different layer of the same network message.

20. A non-transitory computer-readable-storage medium comprising one or more computer-readable instructions that, when executed by at least one processor of a computing device, cause the computing device to:

identify an endpoint computing system that is connected to a wireless network;

receive, by a backend security server from the endpoint computing system:

information that identifies the wireless network;

information that indicates in part a security state of the wireless network by indicating at least:

a degree of trust of the wireless network provided by a user of the endpoint computing system; and a hygiene score of the endpoint computing system;

calculate, by the backend security server, a reputation of the wireless network based at least in part on:

the received information that identifies the wireless network and that indicates in part the security state of the wireless network; and a number of endpoint computing systems that are associated with the wireless network that have hygiene scores below a threshold score; and improve a security state of another endpoint computing system that is within range of the same wireless network by transmitting information about the calculated reputation of the wireless network to the another endpoint computing system to prevent the another endpoint computing system from connecting to the wireless network in response to determining that the wireless network represents a security risk based on the calculated reputation.

* * * * *